US012314765B2

(12) United States Patent
Creed et al.

(10) Patent No.: US 12,314,765 B2
(45) Date of Patent: May 27, 2025

(54) METHOD AND APPARATUS FOR DYNAMIC CPU ALLOCATION BASED ON FEATURE USAGE PROFILES OF SHARED GLOBAL MEMORY

(71) Applicant: Dell Products, L.P., Hopkinton, MA (US)

(72) Inventors: John Creed, Innishannon (IE); Owen Martin, Hopedale, MA (US)

(73) Assignee: Dell Products, L.P., Hopkinton, MA (US)

( * ) Notice: Subject to any disclaimer, the term of this patent is extended or adjusted under 35 U.S.C. 154(b) by 555 days.

(21) Appl. No.: 17/856,960

(22) Filed: Jul. 2, 2022

(65) Prior Publication Data
US 2024/0004716 A1 Jan. 4, 2024

(51) Int. Cl.
*G06F 9/50* (2006.01)
*G06F 9/38* (2018.01)
*G06F 9/54* (2006.01)

(52) U.S. Cl.
CPC .......... *G06F 9/5038* (2013.01); *G06F 9/3877* (2013.01); *G06F 9/505* (2013.01); *G06F 9/544* (2013.01)

(58) Field of Classification Search
CPC ......... G06F 9/5038; G06F 9/544; G06F 9/505
See application file for complete search history.

(56) References Cited

U.S. PATENT DOCUMENTS

| 8,893,128 B2 * | 11/2014 | Levin | G06F 9/5016 |
| | | | 709/224 |
| 9,274,840 B2 * | 3/2016 | Dawson | G06F 9/5016 |
| 2015/0212858 A1 * | 7/2015 | Busaba | G06F 9/5077 |
| | | | 718/103 |

* cited by examiner

*Primary Examiner* — Lewis A Bullock, Jr.
*Assistant Examiner* — Carlos Alberto Espana
(74) *Attorney, Agent, or Firm* — Anderson Gorecki LLP (57) ABSTRACT

Feature usage profiles of shared global memory are monitored and the profiles are used to allocate computational resources (CPU cores) between thread groups. A global memory monitor is used to monitor global memory metadata to determine the amount of space currently being consumed by a particular feature or service, and dynamically adjusts the amount of computational resources allocated to the thread group responsible for processing IO operations related to the feature or service. By exploiting an inversely proportional relationship between allocated computational resources and usage of shared global memory, it is possible to monitor feature usage profiles of shared global memory to dynamically allocate computational resources to thread groups. By looking at anomalies in usage of slots of shared global memory, and in a targeted way speeding up the processes working on such slots, it is possible to improve overall utilization of shared global memory.

18 Claims, 8 Drawing Sheets

METHOD AND APPARATUS FOR DYNAMIC CPU ALLOCATION BASED ON FEATURE USAGE PROFILES OF SHARED GLOBAL MEMORY

FIELD

This disclosure relates to computing systems and related devices and methods, and, more particularly, to a method and apparatus for dynamic CPU allocation based on feature usage profiles of shared global memory.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Storage systems provide storage resources for host computers. In some embodiments, all read and write operations use shared global memory to temporarily store data that is being written to the storage system or read from the storage system. Different thread groups are used to process different types of storage operations, including read miss operations, read hit operations, host write operations, local replication write operations, and management operations. The threads execute on multiple CPU cores within the storage system are used to process the IO operations.

In some embodiments, feature usage profiles of the shared global memory are monitored and the profiles are used to allocate CPU cores between thread groups. In some embodiments, CPU cores are allocated to thread groups based on a determination of how many slots of shared global memory are currently occupied by IO operations that are performed by the thread group. A global memory monitor is used to monitor global memory metadata to determine the amount of space currently being consumed by a particular feature or service, and dynamically adjusts the amount of compute resource (CPU cores) allocated to the thread group responsible for processing IO operations related to the feature or service.

In some embodiments, the amount of shared global memory consumed by a particular service gives an indication of the apparent demand for that data service. If a data service has a lot of work to do, it requires more compute (CPU) resources. Conversely, the more compute (CPU) resources a data service has the less shared global memory it requires. By exploiting this inversely proportional relationship between compute (CPU) resources and usage of shared global memory, it is possible to monitor feature usage profiles of shared global memory to dynamically allocate CPU cores to thread groups. By looking at anomalies in usage of slots of shared global memory, and in a targeted way speeding up the processes working on such slots, it is possible to reduce the time each of the respective slots stays in shared global memory and, hence, improve utilization of shared global memory.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
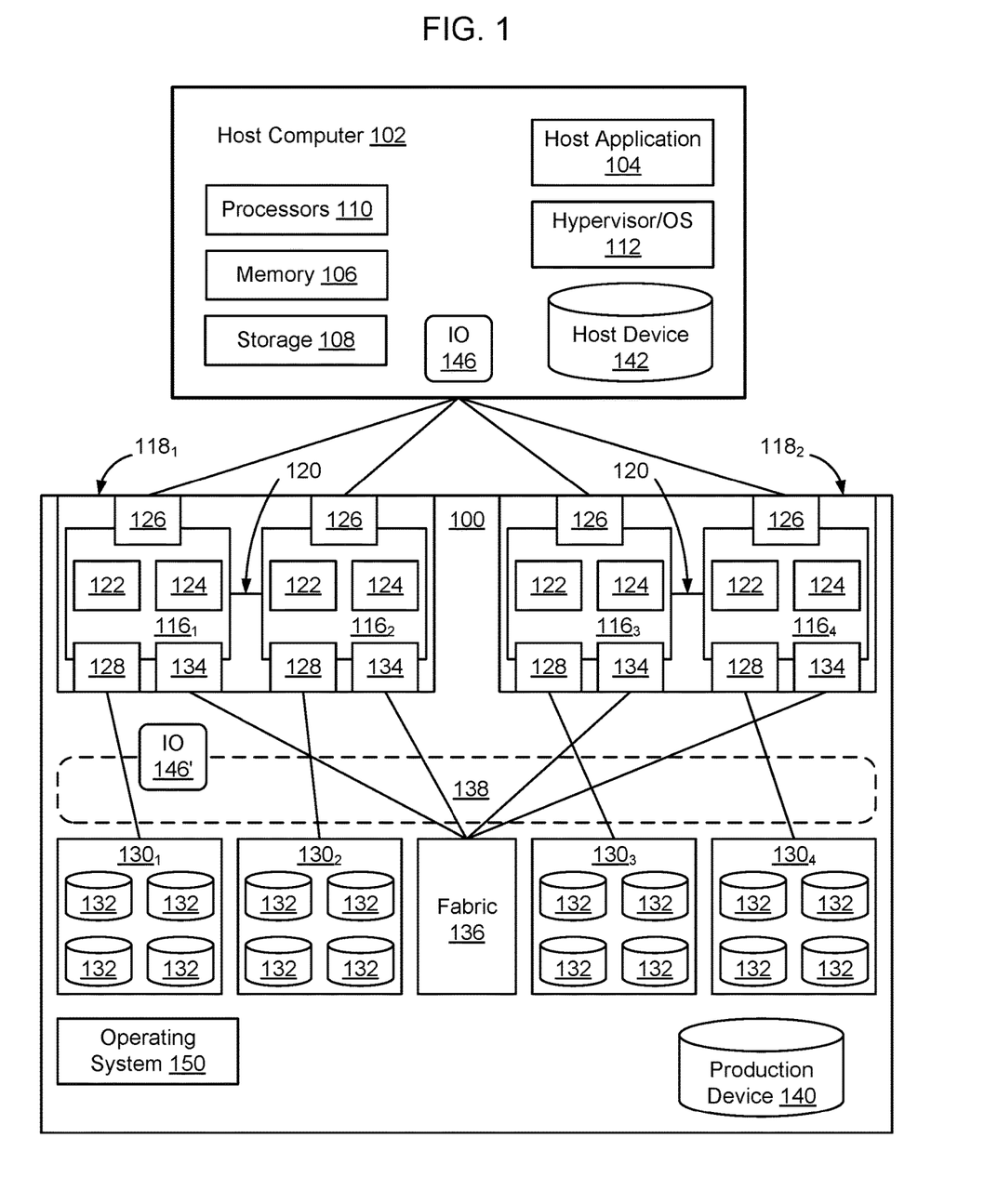
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Figure 2:
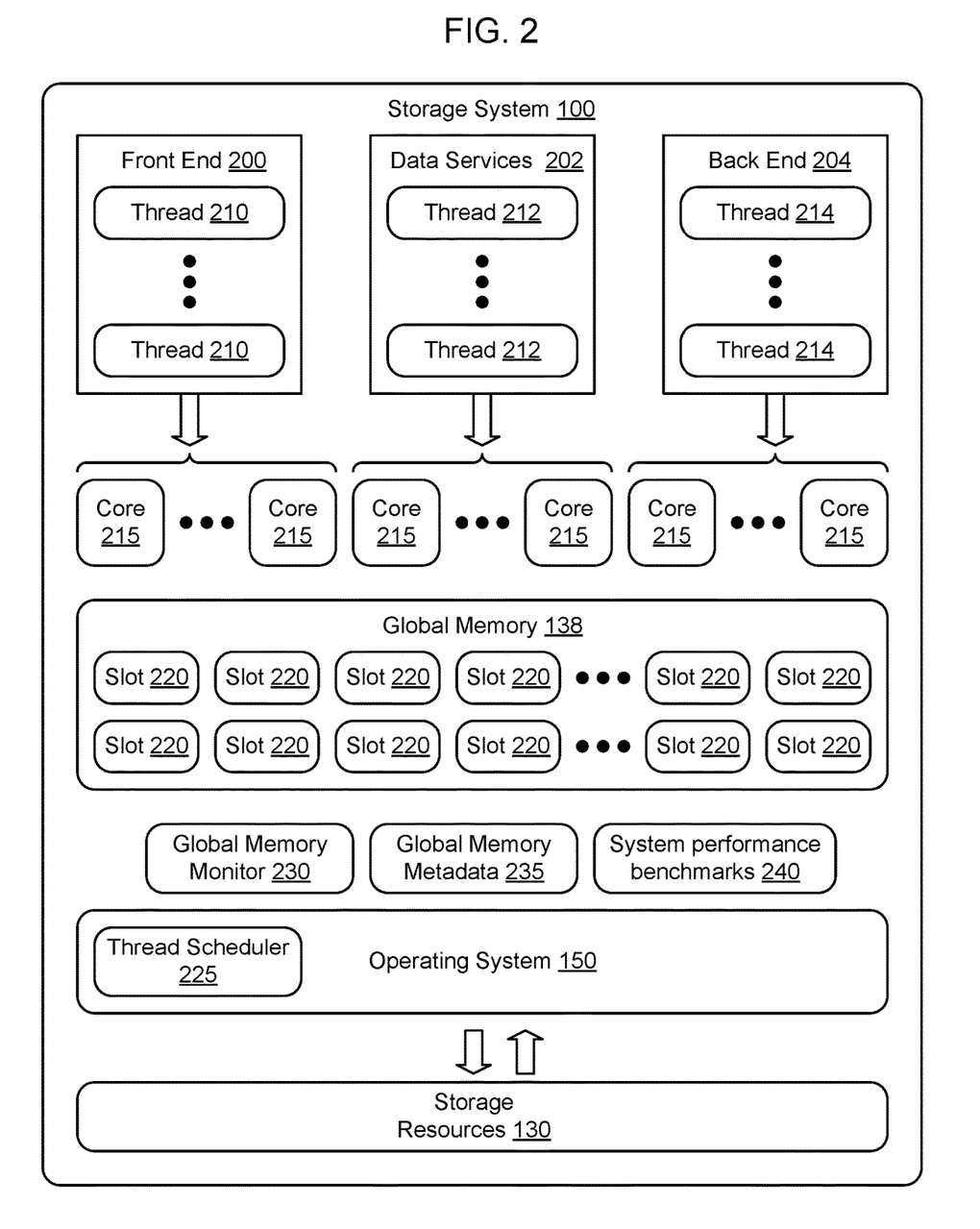
FIG. 2 is a functional block diagram of an example storage system showing aspects of the thread/CPU processing environment in greater detail, according to some embodiments.

FIG. 2 is a functional block diagram of an example storage system showing aspects of the thread/CPU processing environment in greater detail, according to some embodiments. As shown in FIG. 2, in some embodiments the storage system has a set of thread groups 200, 202, 204, each of which is assigned to process particular types of operations. In FIG. 2, the thread groups are labeled "Front End" 200, "Data Services" 202, and "Back End" 204. Other labels may be used as well, depending on the implementation. For ease of explanation, the remainder of the description will refer to "thread groups" as being responsible for various types of IO operations on storage system 100. Each thread group may have tens, hundreds, or thousands of individual threads. A "thread" as that term is used herein, part of a computing process. A computing process may, for example, be configured to process host write operations on a storage system. The process configured to process host write operations may have multiple threads, each of which executes independently to process individual host write operations or portions of individual host write operations. Accordingly, the process, as a whole, contains a thread group that contains a number of threads each of which is configured to implement host write operations on the storage system. A given process may have threads configured to process only one type of IO operation, or may contain different threads configured to process different types of IO operations on a storage system.

In some storage systems, there are two basic input/output operations: read operations and write operations. Read operations may be further subdivided into read hits and read misses. In some embodiments, data is stored in shared global memory temporarily prior to be written to back-end storage resources 130. Data may also be pre-read into shared global memory, for example in connection with a determination that a sequential read is occurring. Whenever a host requests data, the storage system determines if the requested data is currently stored in one or more slots of shared global memory. If the requested data is already in shared global memory, the read operation is referred to herein as a "read hit". If the requested data is not already in shared global memory, the requested data is referred to as a "read miss". In some embodiments, different thread groups are used to process read hits and read misses. The thread group that is used to process read hit IO operations will be referred to herein as a "read hit thread group". The thread group that is used to process read miss IO operations will be referred to herein as a "read miss thread group". In some embodiments, the read hit thread group is implemented by the front end process 200, and the read miss thread group is processed by the back end process 204. In other embodiments, different processes may contain these thread groups.

Similarly, there are multiple types of write IO operations that may be implemented on a storage system. For example, when a host writes data to the storage system, in some embodiments the data is written by the front-end adapter into one or more slots of shared global memory. The data is then destaged (written) at a later point in time to a location in back-end storage resources 130. The thread group that is used to process the host write operations associated with moving data from shared global memory to back end storage resources 130 will be referred to herein as a write destage thread group. In some embodiments, the write destage thread group is implemented by the data services process 202. In other embodiments, a different process may contain the write destage thread group.

Another type of write IO operations that might be implemented on a storage system are referred to herein as local replication IO operations. Local replication provides the ability to replicate (make a copy of) a storage volume locally within an array or between arrays within a local cluster. In some embodiments, local replication uses slots of shared global memory in connection with implementing the local replication operations. The thread group that is used to process the local replication write operations associated with write operations associated with locally replicating storage volumes will be referred to herein as a write LREP thread group. In some embodiments, the write destage thread group is implemented by the data services process 202. In other embodiments, a different process may contain the write destage thread group.

Other types of write operations, such as remote replication write operations may also be supported by additional thread groups. Thus, the selection of thread groups executing on the CPU cores of the storage engine will depend on the particular implementation. Similarly, non-data operations such as management operations may have another thread group that is configured to share the dynamically allocated set of CPU cores. Accordingly, although some embodiments will be described in connection with monitoring usage profiles of shared global memory and dynamically allocating computational resources (CPU cores) between thread groups assigned to process particular IO operations on the storage system, it should be understood that the process can be extended to also include allocation of computational resources to other thread groups operating in the storage system as well.

In FIG. 2, the storage system 100 is shown as having three processes, each of which has a set of threads. It should be understood that a given process may include more than one thread group. Thus, for example, the threads 210 of the front-end 200 might be responsible for read hits, the threads 212 of the back-end 202 might be responsible for read misses, and the threads 214 of the data services 204 might be responsible for destage writes and local replication writes. Thus, a given process might encompass more than one thread group, depending on the implementation.

In some embodiments, any time a slot 220 of shared global memory is used to store data, the type of operation that caused the data to be stored in the slot 220 of shared global memory is written to global memory metadata 235. For example, the global memory metadata 235 may include operation identifiers indicating whether the slot 220 has been reserved for use in connection with a read hit, read miss, write destage, or write LREP operation. Non-data operations, such as management operations, may also use slots of shared global memory 220.

In some embodiments, storage system 100 is tested to determine the maximum number of each type of IO operation that the storage system can perform. These values are referred to herein as "benchmarks" 240. For example, a test can be performed to see the maximum number of write destage operations the write destage thread group can perform per unit time, after which point other system components such as a fabric or the back-end storage resources limit the number of destage operations that are able to be performed by the thread group, regardless of the number of additional computational resources allocated to the thread group. Thus, the benchmarks 240 serve as limits on the number of CPU cores that should be allocated to any given thread group.

According to some embodiments, a global memory monitoring process is used to monitor the type of operations that are associated with slots 220 of shared global memory 138. At the end of each monitoring interval, the global memory monitor 230 retrieves IO operation type information from global memory metadata 235 and determines the percentage of occupied slots 220 that are associated with each of the thread groups. An example monitoring interval may be five minutes or another time interval depending on the implementation. An increase in the number of slots associated with a particular type of IO operation indicates that there is additional work of that type that needs to be implemented on the storage system. Accordingly, in some embodiment the global memory monitor 230 assigns additional CPU cores to the thread groups that are responsible for processing the IO operations that are occupying the increased number of slots of shared global memory 220, and decreases the number of CPU cores that are allocated to thread groups responsible for processing the IO operations that are occupying a decreased number of slots of shared global memory 220.

In some embodiments, if the global memory monitor 230 determines that some the number of CPU cores should be dynamically adjusted, the global memory monitor 230 sends an instruction to a thread scheduler 225 of the operating system 150 to enable the thread scheduler 225 to spread the threads of the thread groups across different numbers of CPU cores. In this way, threads of a thread group that is responsible for IO operations that are occupying a larger percentage of slots 220 of shared global memory 138 will be spread across a larger number of CPU cores, which will enable additional work of that type to be implemented in a subsequent monitoring interval.

Figure 3:
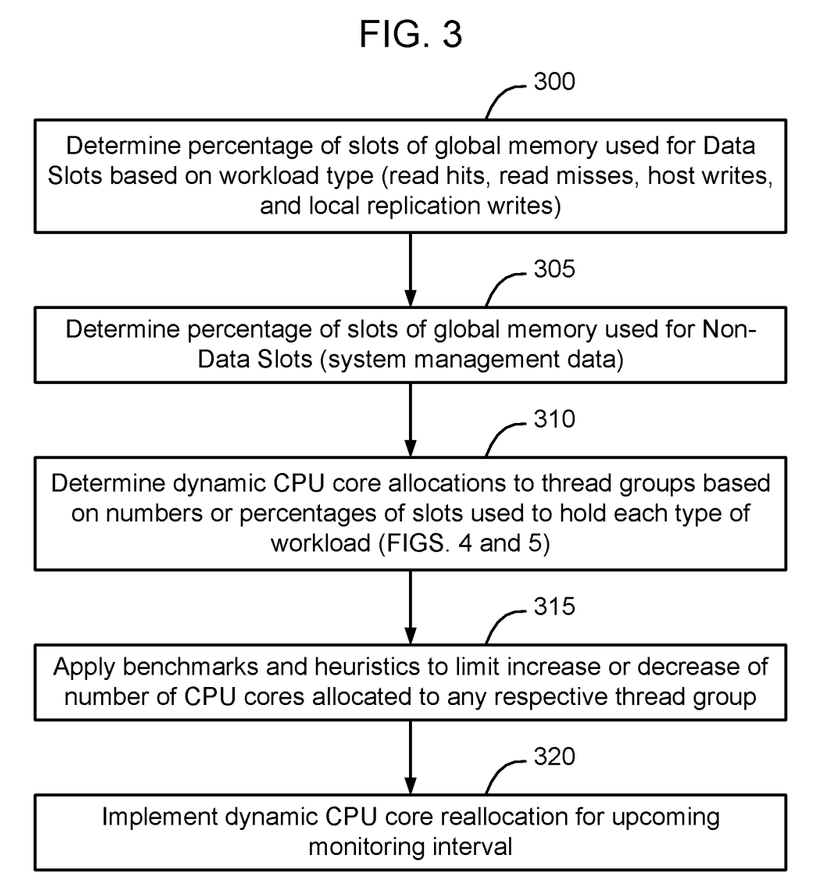
FIG. 3 is a flow chart of a process of dynamic CPU allocation based on feature usage profiles of shared global memory, according to some embodiments.

FIG. 3 is a flow chart of a process of dynamic CPU allocation based on feature usage profiles of shared global memory, according to some embodiments. As shown in FIG. 3, in some embodiments, at the end of each monitoring interval, the global memory monitor 230 determines the percentage of slots 220 of shared global memory 138, that are being used as data slots, for each workload type (read hits, read misses, host writes, and local replication writes) (block 300). Although some embodiments are described in which the global memory monitor 230 determines these four particular types of IO operations, the global memory monitor 230 may also determine other types of IO operations of interest and the same process of dynamically allocating CPU cores to thread groups can be used to in embodiments where the global memory monitor 230 monitors other slot usage types. For example, as shown in FIG. 3, the global memory monitor 230 may also optionally determine the percentage of the slots of shared global memory used for non-data slots which may be used, for example, to store system management data (block 305).

The global memory monitor then dynamically allocates CPU cores to corresponding thread groups based on feature usage profiles of shared global memory usage, as determined by the percentages of each type of IO operations that are occupying slots of shared global memory (block 310). In some embodiments, each thread group is allocated a fixed minimum number of CPU cores. For example, if there are 100 CPU cores on a given compute node 116, each of the read hit thread group, the read miss thread group, the write destage thread group, and the write LREP thread group may be allocated a minimum of 20 cores. The remaining 20 cores referred to herein as the "dynamically assigned subset of CPU cores" may be moved between the set of thread groups based on the percentages of each type of IO operations. Of course, different fixed minimum numbers of CPU cores may be allocated to each of the thread groups, depending on the implementation.

In some embodiments, the dynamically assigned subset of CPU cores are moved in small increments between the set of thread groups that participate in the dynamic CPU allocation process described herein. For example, the global memory monitor 230 may move two cores in any monitoring interval. Other numbers of the dynamically assigned subset of CPU cores may similarly be moved each monitoring interval, depending on the implementation. By tightly constraining the movement of CPU cores between thread groups, it should be possible to enable increased processing power for thread groups when the IO workload associated with the thread group is disproportionately occupying slots 220 of shared global memory, without causing degradation in service elsewhere in the system.

Additionally, in some embodiments, the global memory monitor 230 is configured to monitor slot usage over time to detect trends in slot usage by particular types of IO operations. A trend in slot usage may indicate that assigning additional CPU cores to a particular thread group might not be beneficial due to other conditions on the storage system. For example, if one of the thread groups is responsible for processing remote replication write operations, and the number of slots 220 associated with remote replication write operations is increasing, the global memory monitor 230 might allocate additional CPU cores to the remote replication thread group after a first monitoring interval. However, if in a subsequent monitoring interval the global memory monitor 230 determines that the additional CPU cores did not reduce the percentage of slots allocated to remote replication write operations, and perhaps that the percentage of slots allocated to remote replication write operations has increased, a determination may be made that additional CPU cores are not the limiting factor in processing remote replication write operations. For example, a link associated with remote replication may be limiting the number of remote replication write operations that are able to be processed by the respective thread group. In this instance, the global memory monitor 230 will not increase the number of CPU cores allocated to the remote replication write thread and may even revert back to the original number of CPU cores, since the previous increase in the CPU core allocation did not result in the intended reduction in the number of slots 220 being used by remote replication write operations.

There are many ways that the global memory monitor 230 may compare slot 220 usage by the various thread groups. In some embodiments, the global memory monitor 230 has a set of threshold values that are applied to the set of thread groups. In other embodiments, the global memory monitor 230 bases computational resource usage allocations based on changes in slot usage between monitoring intervals of the various workload types. The particular manner in which the global memory monitor compares slot usage values will depend on the particular implementation.

Figure 4:
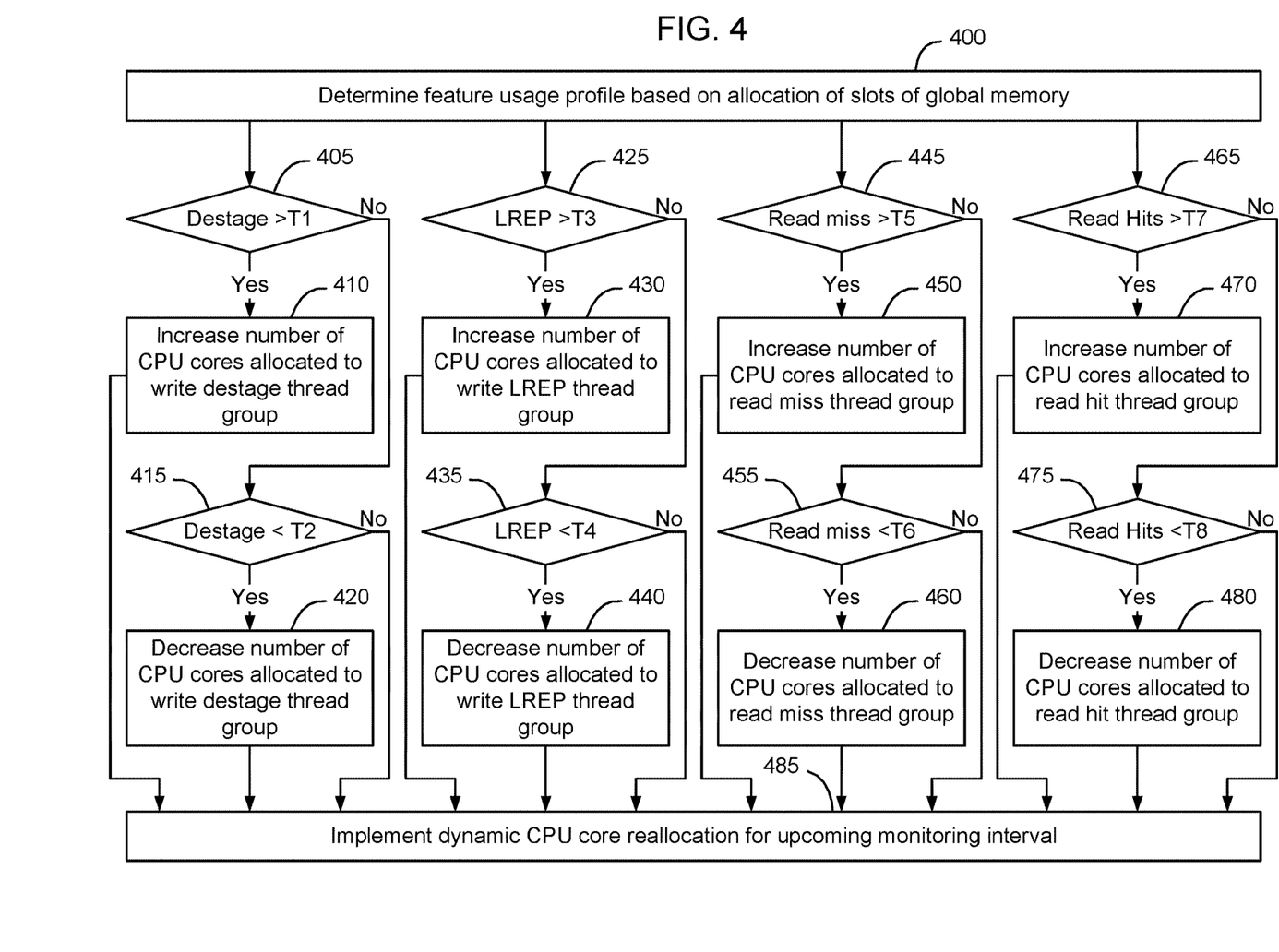
FIG. 4 is a flow chart showing an example process of dynamic CPU allocation based on feature usage profiles of shared global memory, according to some embodiments.

FIG. 4 is a flow chart showing an example process of dynamic CPU allocation based on feature usage profiles of shared global memory in which the global memory monitor determines features usage profiles of workloads on the storage system based on allocation of slots of shared global memory to each of the workload types, according to some embodiments. In the example shown in FIG. 4, the global memory monitor compares percentage slot usage values of the various workload types with thresholds, to determine whether the number of dynamically assigned subset of CPU cores that is assigned to a particular thread group should be increased or decreased. It should be understood that similar or other ways of determining how to increase or decrease the number of dynamically assigned CPU cores that are assigned to each thread group could be used as well depending on the implementation.

Also, in connection with describing FIG. 4, some embodiments will be described in which the feature usage profiles are based on percentages of slots in shared global memory that are used by the respective workload of each thread group. It should be understood that absolute numbers could be used instead of percentages, depending on the implementation.

As shown in FIG. 4, when the feature usage profile is determined (block 400), which in some embodiments is based on the allocation of slots of shared global memory to each of the workload types, the global memory monitor 230 uses the feature usage profile to determine the relative number of dynamically assigned subset of CPU cores that should be assigned to each of the controlled thread groups.

For example, as shown in FIG. 4, in some embodiments one aspect of the feature usage profile of shared global memory is associated with the percentage of slots of shared global memory that are holding data associated with host write operations that need to be processed by the write destage thread group. The global memory monitor 230 compares the percentage of shared slots of shared global memory that that contain data for processing by the write destage thread group with a first promotion threshold T1 (block 405). If the percentage of slots of shared global memory that that contain data for processing by the write destage thread group is higher than the first promotion threshold T1 (a determination of YES at block 405), a determination is made to increase the number of CPU cores that are allocated to the write destage thread group (block 410).

If the percentage of slots of shared global memory that that contain data for processing by the write destage thread group is not higher than the first promotion threshold T1 (a determination of NO at block 405), the percentage of slots of shared global memory that contain data for processing by the write destage thread group is compared with a second demotion threshold T2 (block 415). If the percentage of slots of shared global memory that that contain data for processing by the write destage thread group is lower than the second demotion threshold T2 (a determination of YES at block 415), a determination is made to decrease the number of CPU cores that are allocated to the write destage thread group (block 420).

If the percentage of slots of shared global memory that that contain data for processing by the write destage thread group lower than the first promotion threshold T1 (a determination of NO at block 405), and is higher than the second demotion threshold T2 (a determination of NO at block 415), a determination is made to not change the number of CPU cores that are allocated to the write destage thread group.

As shown in FIG. 4, in some embodiments another aspect of the feature usage profile of shared global memory is associated with the percentage of slots of shared global memory that are holding data associated with local replication write (LREP) operations that need to be processed by the write LREP thread group. The global memory monitor 230 compares the percentage of slots of shared global memory that that contain data for processing by the write LREP thread group with a first promotion threshold T3 (block 425). If the percentage of slots of shared global memory that that contain data for processing by the write LREP thread group is higher than the first promotion threshold T3 (a determination of YES at block 425), a determination is made to increase the number of CPU cores that are allocated to the write LREP thread group (block 430).

If the percentage of slots of shared global memory that that contain data for processing by the write LREP thread group is not higher than the first promotion threshold T3 (a determination of NO at block 425), the percentage of slots of shared global memory that contain data for processing by the write LREP thread group is compared with a second demotion threshold T4 (block 435). If the percentage of slots of shared global memory that that contain data for processing by the write LREP thread group is lower than the second demotion threshold T4 (a determination of YES at block 435), a determination is made to decrease the number of CPU cores that are allocated to the write LREP thread group (block 440).

If the percentage of slots of shared global memory that that contain data for processing by the write LREP thread group lower than the first promotion threshold T3 (a determination of NO at block 425), and is higher than the second demotion threshold T4 (a determination of NO at block 435), a determination is made to not change the number of CPU cores that are allocated to the write LREP thread group.

As shown in FIG. 4, in some embodiments another aspect of the feature usage profile of shared global memory is associated with the percentage of slots of shared global memory that are holding data associated with host read operations that need to be processed by the read miss thread group. The global memory monitor 230 compares the percentage of slots of shared global memory that that contain data for processing by the read miss thread group with a first promotion threshold T5 (block 445). If the percentage of slots of shared global memory that that contain data for processing by the read miss thread group is higher than the first promotion threshold T5 (a determination of YES at block 445), a determination is made to increase the number of CPU cores that are allocated to the read miss thread group (block 450).

If the percentage of slots of shared global memory that that contain data for processing by the read miss thread group is not higher than the first promotion threshold T5 (a determination of NO at block 445), the percentage of slots of shared global memory that contain data for processing by the read miss thread group is compared with a second demotion threshold T6 (block 455). If the percentage of slots of shared global memory that that contain data for processing by the read miss thread group is lower than the second demotion threshold T6 (a determination of YES at block 455), a determination is made to decrease the number of CPU cores that are allocated to the read miss thread group (block 460).

If the percentage of slots of shared global memory that that contain data for processing by the read miss thread group lower than the first promotion threshold T5 (a determination of NO at block 445), and is higher than the second demotion threshold T6 (a determination of NO at block 455), a determination is made to not change the number of CPU cores that are allocated to the read miss thread group.

As shown in FIG. 4, in some embodiments another aspect of the feature usage profile of shared global memory is associated with the percentage of slots of shared global memory that are holding data associated with host read operations that need to be processed by the read hits thread group. The global memory monitor 230 compares the percentage of slots of shared global memory that that contain data for processing by the read hits thread group with a first promotion threshold T7 (block 465). If the percentage of slots of shared global memory that that contain data for processing by the read hits thread group is higher than the first promotion threshold T7 (a determination of YES at block 465), a determination is made to increase the number of CPU cores that are allocated to the read hits thread group (block 470).

If the percentage of slots of shared global memory that that contain data for processing by the read hits thread group is not higher than the first promotion threshold (a determination of NO at block 465), the percentage of slots of shared global memory that contain data for processing by the read hits thread group is compared with a second demotion threshold T8 (block 475). If the percentage of slots of shared global memory that that contain data for processing by the read hits thread group is lower than the second demotion threshold T8 (a determination of YES at block 475), a determination is made to decrease the number of CPU cores that are allocated to the read hits thread group (block 480).

If the percentage of slots of shared global memory that that contain data for processing by the read hits thread group lower than the first promotion threshold T7 (a determination of NO at block 465), and is higher than the second demotion threshold T8 (a determination of NO at block 475), a determination is made to not change the number of CPU cores that are allocated to the read hits thread group.

In some embodiments, the determinations whether to increase, decrease, or keep the same allocation for each of the thread groups is performed in parallel. However, in some embodiments the determinations may be implemented serially. After determining which thread groups should receive an increase or decrease in number of CPU cores that are allocated from the dynamically assigned subset of CPU cores, the global memory monitor 230 instructs the thread scheduler 225 to implement the new CPU core allocations for the upcoming monitoring interval (block 485).

Figure 5:
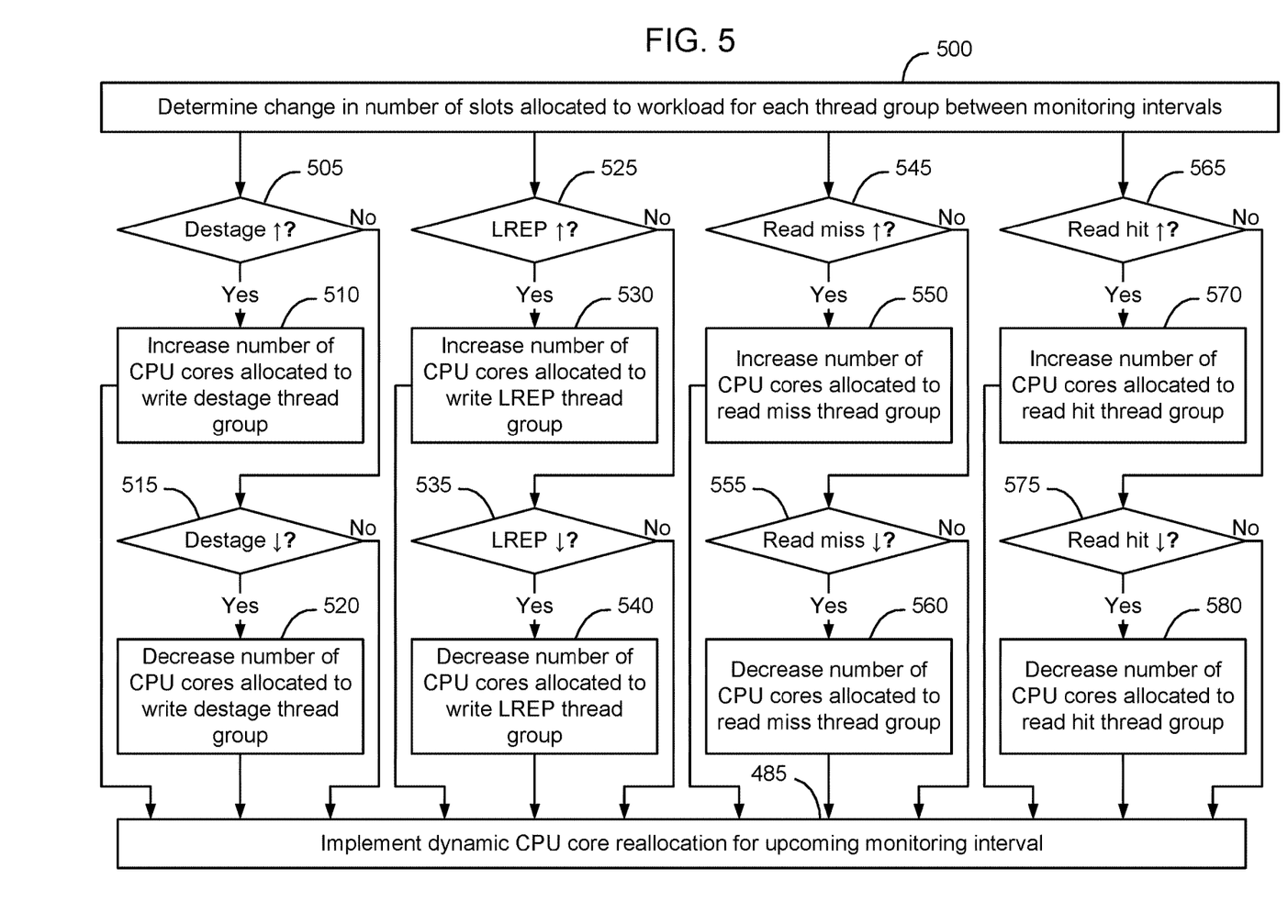
FIG. 5 is a flow chart showing another example process of dynamic CPU allocation based on feature usage profiles of shared global memory, according to some embodiments.

FIG. 5 is a flow chart showing an example process of dynamic CPU allocation based on feature usage profiles of shared global memory in which the global memory monitor determines features usage profiles of workloads on the storage system based on allocation of slots of shared global memory to each of the workload types, according to some embodiments. In the example shown in FIG. 5, the global memory monitor monitors changes to the feature profiles over time, to determine whether the number of dynamically assigned subset of CPU cores that is assigned to a particular thread group should be increased or decreased. It should be understood that similar or other ways of determining how to increase or decrease the number of dynamically assigned CPU cores that are assigned to each thread group could be used as well depending on the implementation.

Also, in connection with describing FIG. 5, some embodiments will be described in which the feature usage profiles are based on percentages of slots in shared global memory that are used by the respective workload of each thread group. It should be understood that absolute numbers could be used instead of percentages, depending on the implementation.

As shown in FIG. 5, when the feature usage profile is determined (block 500), which is based on the allocation of slots of shared global memory to each of the workload types, the global memory monitor 230 uses the feature usage profile to determine the relative number of dynamically assigned subset of CPU cores that should be assigned to each of the controlled thread groups.

For example, as shown in FIG. 5, in some embodiments one aspect of the feature usage profile of shared global memory is associated with the percentage of slots of shared global memory that are holding data associated with host write operations that need to be processed by the write destage thread group. The global memory monitor 230 compares the percentage of slots of shared global memory that that contain data for processing by the write destage thread group with a previous value taken at a prior monitoring interval (block 505). If the percentage of slots of shared global memory that that contain data for processing by the write destage thread group is increasing (a determination of YES at block 505), a determination is made to increase the number of CPU cores that are allocated to the write destage thread group (block 510).

If the percentage of slots of shared global memory that that contain data for processing by the write destage thread group is not increasing (a determination of NO at block 505), a determination is made by the global memory monitor 230 as to whether the percentage of slots of shared global memory that contain data for processing by the write destage thread group is decreasing (block 515). If the percentage of slots of shared global memory that that contain data for processing by the write destage thread group is decreasing (a determination of YES at block 515), a determination is made to decrease the number of CPU cores that are allocated to the write destage thread group (block 520).

If the percentage of slots of shared global memory that that contain data for processing by the write destage thread group is not increasing (a determination of NO at block 505), and is not decreasing (a determination of NO at block 515), a determination is made to not change the number of CPU cores that are allocated to the write destage thread group. In some embodiments, an increase or decrease must be greater than an incremental amount to result in a positive determination in block 505 or 515.

As shown in FIG. 5, in some embodiments another aspect of the feature usage profile of shared global memory is associated with the percentage of slots of shared global memory that are holding data associated with local replication write operations (LREP) that need to be processed by the write LREP thread group. The global memory monitor 230 compares the percentage of slots of shared global memory that that contain data for processing by the LREP thread group with a previous value taken at a prior monitoring interval (block 525). If the percentage of slots of shared global memory that that contain data for processing by the LREP thread group is increasing (a determination of YES at block 525), a determination is made to increase the number of CPU cores that are allocated to the LREP thread group (block 530).

If the percentage of slots of shared global memory that that contain data for processing by the LREP thread group is not increasing (a determination of NO at block 525), a determination is made by the global memory monitor 230 as to whether the percentage of slots of shared global memory that contain data for processing by the LREP thread group is decreasing (block 535). If the percentage of slots of shared global memory that that contain data for processing by the LREP thread group is decreasing (a determination of YES at block 535), a determination is made to decrease the number of CPU cores that are allocated to the LREP thread group (block 540).

If the percentage of slots of shared global memory that that contain data for processing by the LREP thread group is not increasing (a determination of NO at block 525), and is not decreasing (a determination of NO at block 535), a determination is made to not change the number of CPU cores that are allocated to the LREP thread group. In some embodiments, an increase or decrease must be greater than an incremental amount to result in a positive determination in block 525 or 535.

As shown in FIG. 5, in some embodiments another aspect of the feature usage profile of shared global memory is associated with the percentage of slots of shared global memory that are holding data associated with read miss operations that need to be processed by the read miss thread group. The global memory monitor 230 compares the percentage of slots of shared global memory that that contain data for processing by the read miss thread group with a previous value taken at a prior monitoring interval (block 545). If the percentage of slots of shared global memory that that contain data for processing by the read miss thread group is increasing (a determination of YES at block 545), a determination is made to increase the number of CPU cores that are allocated to the read miss thread group (block 550).

If the percentage of slots of shared global memory that that contain data for processing by the read miss thread group is not increasing (a determination of NO at block 545), a determination is made by the global memory monitor 230 as to whether the percentage of slots of shared global memory that contain data for processing by the read miss thread group is decreasing (block 555). If the percentage of slots of shared global memory that that contain data for processing by the read miss thread group is decreasing (a determination of YES at block 555), a determination is made to decrease the number of CPU cores that are allocated to the read miss thread group (block 560).

If the percentage of slots of shared global memory that that contain data for processing by the read miss thread group is not increasing (a determination of NO at block 545), and is not decreasing (a determination of NO at block 555), a determination is made to not change the number of CPU cores that are allocated to the read miss thread group. In some embodiments, an increase or decrease must be greater than an incremental amount to result in a positive determination in block 545 or 555.

As shown in FIG. 5, in some embodiments another aspect of the feature usage profile of shared global memory is associated with the percentage of slots of shared global memory that are holding data associated with read hit operations that need to be processed by the read hit thread group. The global memory monitor 230 compares the percentage of slots of shared global memory that that contain data for processing by the read hit thread group with a previous value taken at a prior monitoring interval (block 565). If the percentage of slots of shared global memory that that contain data for processing by the read hit thread group is increasing (a determination of YES at block 565), a determination is made to increase the number of CPU cores that are allocated to the read hit thread group (block 570).

If the percentage of slots of shared global memory that that contain data for processing by the read hit thread group is not increasing (a determination of NO at block 505), a determination is made by the global memory monitor 230 as to whether the percentage of slots of shared global memory that contain data for processing by the read hit thread group is decreasing (block 575). If the percentage of slots of shared global memory that that contain data for processing by the read hit thread group is decreasing (a determination of YES at block 575), a determination is made to decrease the number of CPU cores that are allocated to the read hit thread group (block 580).

If the percentage of slots of shared global memory that that contain data for processing by the read hit thread group is not increasing (a determination of NO at block 565), and is not decreasing (a determination of NO at block 575), a determination is made to not change the number of CPU cores that are allocated to the read hit thread group. In some embodiments, an increase or decrease must be greater than an incremental amount to result in a positive determination in block 565 or 575.

In some embodiments, the determinations whether to increase, decrease, or keep the same allocation for each of the thread groups is performed in parallel. However, in some embodiments the determinations may be implemented serially. After determining which thread groups should receive an increase in number of CPU cores that are allocated from the dynamically assigned subset of CPU cores, the global memory monitor 230 instructs the thread scheduler 225 to implement the new CPU core allocations for the upcoming monitoring interval (block 585).

Figure 6:
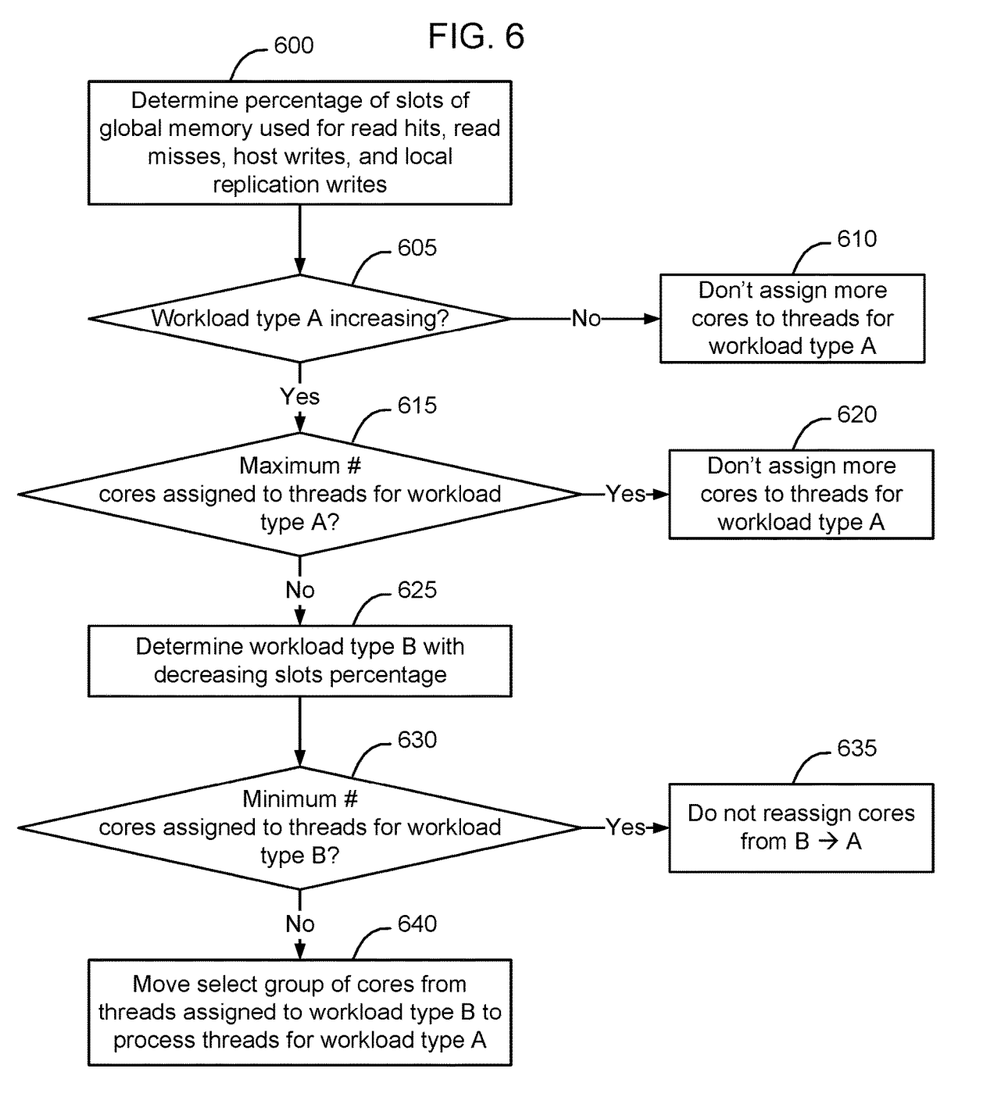
FIG. 6 is a flow chart of an example process of dynamic CPU core allocations between two thread groups, according to some embodiments.

FIG. 6 is a flow chart of an example process of dynamic CPU core allocations between two thread groups, according to some embodiments. As shown in FIG. 6, in some embodiments the global memory monitor 230 determines the percentages (or numbers of) slots of shared global memory currently occupied with data associated with read hit operations, read miss operations, host write destage operations, and local replication (LREP) write operations (block 600).

The global memory monitor 230 then determines whether the workload of one of the types (type A in FIG. 6) is increasing (block 605). In response to a determination that the workload of type A is not increasing (a determination of NO at block 605) the global memory monitor 230 does not assign additional CPU cores to the thread group assigned to process type A workload.

In response to a determination that the workload of type A is increasing (a determination of YES at block 605) the global memory monitor 230 determines whether the maximum number of CPU cores has already been assigned to the thread group assigned to process type A workload (block 615). In response to a determination that the maximum number of CPU cores has already been assigned to the thread group assigned to process type A workload (a determination of YES at block 615), the global memory monitor 230 does not assign additional CPU cores to the thread group assigned to process type A workload.

In response to a determination that the maximum number of CPU cores has not already been assigned to the thread group assigned to process type A workload (a determination of NO at block 615), the global memory monitor 230 attempts to assign additional CPU cores to the thread group assigned to process type A workload. To do this, in some embodiments the global memory monitor 230 identifies a workload of type B that is decreasing (block 625). The global memory monitor 230 then determines whether the number of CPU cores that is currently assigned to the thread group responsible for processing type B workload is a minimum number for that thread group (block 630).

In response to a determination that the number of CPU cores that is currently assigned to the thread group responsible for processing type B workload is a minimum number for that thread group (a determination of YES at block 630), the global memory monitor 230 does not move CPU cores from the threads responsible for processing workload of type B to the threads responsible for processing workload of type A (block 635). In response to a determination that the number of CPU cores that is currently assigned to the thread group responsible for processing type B workload is above the minimum number for that thread group (a determination of NO at block 630), the global memory monitor 230 moves a subset of the CPU cores assigned to be used by the threads responsible for processing workload of type B to the threads responsible for processing workload of type A (block 640).

Figure 7:
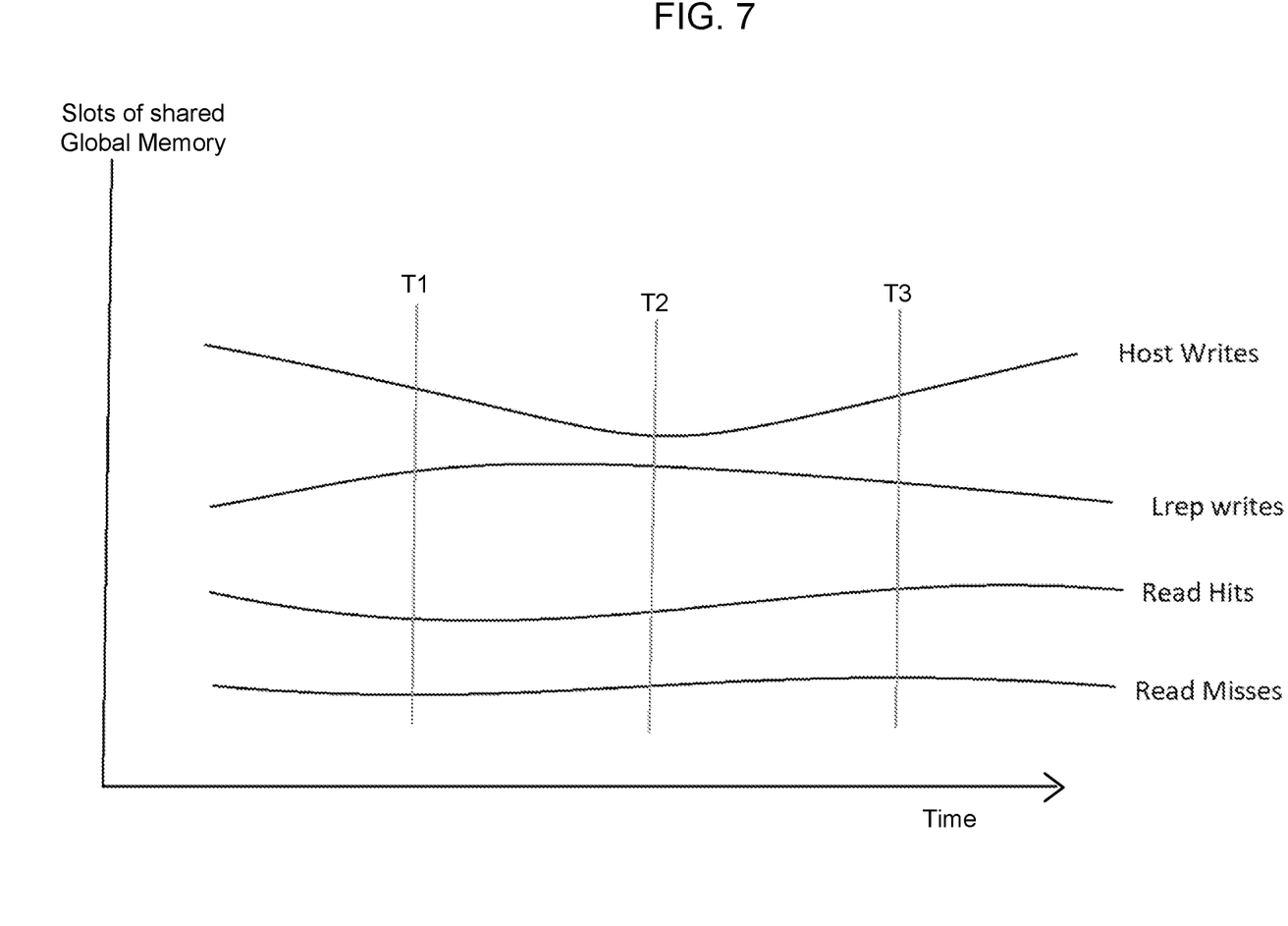
FIG. 7 is an example graph showing the number of slots of shared global memory used by various thread groups over time, according to some embodiments.

FIG. 7 is an example graph showing the number of slots of shared global memory used by various thread groups over time, according to some embodiments. By looking at the IO profile at intervals (labeled T1, T2, and T3 in FIG. 7), as determined by slot usage of shared global memory, it is possible to extract the feature usage profiles to allocate CPU cores between thread groups responsible for processing the data contained in the allocated slots of shared global memory. In some embodiments, during each monitoring interval, such as every five minutes, the global memory monitor 230 determines how many slots of shared global memory are being used for each type of workload, to move CPU core allocations between thread groups. For example, when the read portion of a shared global memory becomes large versus write destage, the global memory monitor 230 allocates more CPUs to the thread group responsible for processing read operations. Likewise, when the write destage portion of a shared global memory becomes large versus the read portion, the global memory monitor 230 allocates more CPUs to the thread group responsible for processing write destage operations.

Figure 8A:
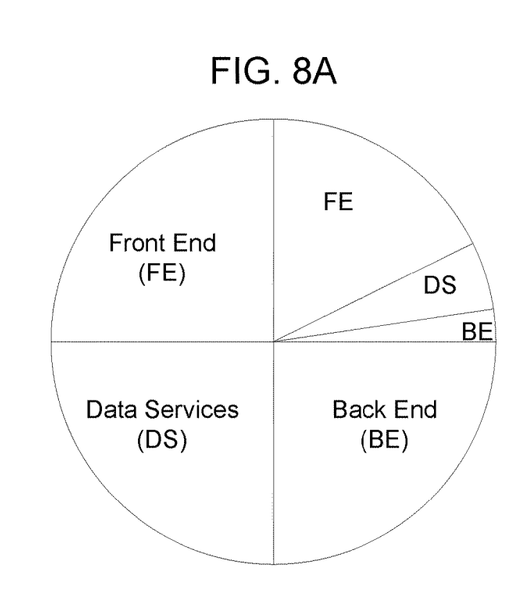
FIGS. 8A-8C are pie charts showing hypothetical allocations of CPU cores between processes having thread groups based on the number of slots of shared global memory in use at particular points in time, according to some embodiments.
Figure 8B:
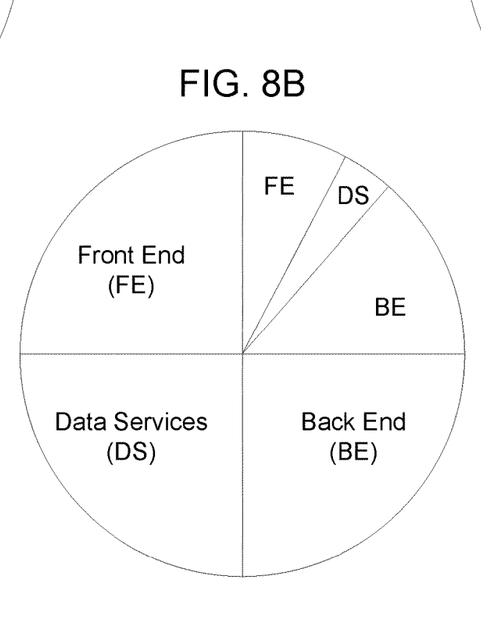
Figure 8C:
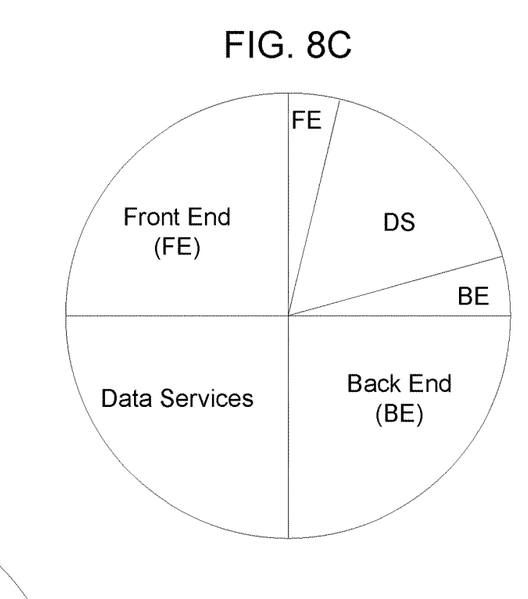

FIGS. 8A-8C are pie charts showing hypothetical allocations of CPU cores between processes having thread groups based on the number of slots of shared global memory in use at particular points in time, according to some embodiments. In the examples shown in FIGS. 8A-8C, the global memory monitor is configured to allocate 25% of the available CPU cores to the thread groups 210 of the front-end processes 200, 25% of the available CPU cores to the thread groups 212 of the data services processes 202, and 25% of the available CPU cores to the thread groups 214 of the back-end processes 204. In some embodiments, these are fixed allocations and are minimum CPU core allocations within the storage system. Other minimum numbers of CPU cores may be selected depending on the implementation, and different numbers (percentages) of minimum numbers of CPU cores may be provided for different sets of processes (e.g. 20% for the front-end processes, 30% for the data services processes, and 40% for back-end processes).

In the examples shown in FIGS. 8A-8C, 25% of the available CPU cores are able to be allocated (dynamically assigned) to the threads groups of the front-end processes 200, the data services processes 202, and the back-end processes 204. In FIG. 8A, most of the 25% of available dynamically assignable CPU cores are shown as being allocated to the front-end (FE) processes 200, and smaller numbers are allocated to the data services (DS) processes 202, and the back-end (BE) processes 204. In FIG. 8B, the CPU core allocation has changed, with a majority of the 25% of available dynamically assignable CPU cores are shown as being allocated to the back-end processes 204, and smaller numbers of dynamically assignable CPU cores are allocated to the front-end processes 200 and to the data services processes 202. In FIG. 8C, the CPU core allocation has again changed, with a majority of the 25% of available dynamically assignable CPU cores are shown as being allocated to the data services processes 202, and smaller numbers of dynamically assignable CPU cores are allocated to the front-end processes 200 and to the back-end processes 204.

Some embodiments of dynamic CPU core allocations work on the principal that how much compute a thread group requires is a function of how much shared global memory the thread group is operating on. In some embodiments, the global memory monitor 230 identifies the amount of space of shared global memory currently being consumed by a particular feature or service and dynamically adjusts the amount of compute (CPU) resources accordingly.

In some high end storage arrays, CPU cores are assigned around three main subgroups: 1) back end, 2) data services, and 3) front end. Within each of these there are thread groups for various services related to each. As discussed in greater detail herein, in some embodiments the global memory monitor 230 looks at the profile of current and recent shared global memory usage to determine if it would be beneficial to assign more computational resources (CPU cores) to a specific thread group. The amount of shared global memory currently being consumed by a particular service gives an indication of the apparent demand for that data service. If a data service has a lot of work to do it requires more computational resources (CPU cores) and the more compute (CPU) resources a data service has the less shared global memory it requires. It can therefore be said that there is an inversely proportional relationship between the computational resources (CPU cores) a data service has and its shared global memory requirement. By providing a global memory monitor 230, it is possible to determine that a particular thread group is beginning to consume a larger amount of shared global memory, and react to this by assigning more computational resources (CPU cores) to that thread group.

In some embodiments, the global memory monitor 230 determines how shared global memory is currently being consumed for a specific data service, to make a determination as to the apparent demand for that data service. Current computational resources (CPU cores) demand is a function of shared global memory usage as previously mentioned. In some storage systems, the total number of CPU's on a particular director or blade are divided up between three subgroups preciously mentioned back end (BE), data services (DS) and front end (FE). In some embodiments, the front end is responsible for remote replication.

For example, assume that a given director or blade in a storage system 100 has 100 CPU cores. These cores might be allocated to provide, for example, 33 CPU cores for BE, 33 CPU cores for DS and 34 of CPU cores FE. Within each subgroup the CPUs could be allocated to various thread groups. Shared global memory in the system is divided into banks of shared global memory and in each bank there are subunits called slots. Each time a service requires shared global memory memory space a slot is allocated to that service. Different shared global memory slots in the system associated with the different services have different properties. It can be said that every slot type or slots with specific properties or attributes such as being WP (Write Pending) require compute from specific thread groups in the system and, in some embodiments, the global memory monitor 230 is able to map these slots to a specific thread group.

The slot, in other words, requires work to be done by the system before the slot is free to be relinquished and recycled by the system. If the work is able to get done quicker, this would free up that shared global memory resource sooner. By looking at anomalies in shared global memory slot type usage, and in a targeted way speeding up the processes working on such slots in the storage system 100, it is possible to reduce the time each of these slots stays in shared global memory and thus improve system shared global memory utilization.

In some storage systems, a differentiation is made between data slots, which contain user data (either read data or write data) and non-data slots, which contain system management data related to specific operations to be implemented to configure the storage system itself. In some embodiments, the global memory monitor 230 is also configured to determine if a service or feature is currently down or disabled, and to reallocate compute (CPU) resources and block the allocation of specific slot types in the system or the creation of slots or the conversion of existing slots to slots with specific properties.

For example, in the case of write pending destage slots, in some embodiments additional compute (CPU) resources are allocated to the back end (BE) to help improve destaging (writing/copying) data to back-end storage resources. The global memory monitor 230 may also make a determination to remove compute (CPU) resources from the front end where I/O may be currently getting throttled due to the system being pushed with a higher write workload than it can keep up with.

As another example, if the customer starts off a local replication task, which may for instance create snapshots of data or any kind of business continuity volume or data, the global memory monitor 230 may see many slots of a particular type created in shared global memory. In some embodiments, the global memory monitor 230 is configured to react to this increased count of such slots by allocating additional compute (CPU) resources to specific thread groups that will increase the speed through which these slots will get processed.

As another example, in the case of remote replication the customer may kick of full volume remote replication or activate remote data facility features which create specific slot types in the system. These could be non-data slot types. In some embodiments, the global memory monitor 230 is configured to react to this increased count of such slots by allocating additional compute (CPU) resources to specific thread groups that will increase the speed through which these slots will get processed. Such changes, through, would need to be tightly constrained against causing any degradation in service elsewhere in the system. In the case of remote replication, in some embodiments the global memory monitor 230 is configured to also recognize situations where the remote data link may be down, in which case allocating additional compute resources to the thread group responsible for implementing the remote replication would have no benefit. In some embodiments, the global memory monitor 230 is configured to determine if the remote data link is down, and react to a remote data link failure by redistributing the existing remote replication compute (CPU) resources elsewhere in the system, and to have the shared global memory slot allocation management feature block the allocation of specific types of shared global memory slots due to the remote data link currently being down.

As another example, if a drive fails or is replaced, the global memory monitor 230 may see a drive re-synchronization process start, which may be identified by the global memory monitor in connection with a determination that many slots of a specific type are being created that are related to the physical consistency of volumes on the drive or RAID calculations. In some embodiments, the global memory monitor 230 is configured to react to this increased count of such slots by allocating additional compute (CPU) resources to specific thread groups that will increase the speed through which these slots will get processed.

In some embodiments, the storage system is configured such that there is a subset of the total amount of compute (CPU) resources in the system that is flexible, and may be moved between processes by the global memory monitor. For example, in some embodiments a certain percentage of CPU resources, such as 10% (or another subset percentage) of the CPU resources on a given blade or director, may be moved between thread groups. The global memory monitor 230, in some embodiments, is configured to use this budget of compute (CPU) resources to handle any anomalies in shared global memory slot type usage. The global memory monitor 230 can also monitor the effectiveness of the current CPU allocation policy, such that if the global memory monitor 230 finds that the shared global memory usage goes down after it assigns more CPU cores to a specific subgroup or thread group, then it validates the use case before the global memory monitor 230 commits more resources. If the global memory monitor 230 determines that the shared global memory usage did not decrease or the global memory monitor 230 otherwise determines that adding CPU resources to a particular thread group can't help the scenario because of saturation somewhere in the system, then in some embodiments the global memory monitor 230 is configured to back off of making any further changes to compute (CPU) resource allocations and possibly even revert back a recent change.

In some embodiments, the global memory monitor 230 is configured to group slots of various types with specific parameters set, to be associated with a particular thread group for optimization. To accomplish this, in some embodiments global memory metadata 235 is configured to have a new element associated with slots of shared global memory, that identifies the thread group (thread group ID for example) to directly enable the global memory monitor 230 to determine from the global memory metadata 235 how many slots of shared global memory currently contain data that requires processing by each of the managed thread groups. This would cover the case where a slot of a particular type is created in the system, but later undergoes a process that gives it a new property. By including a field in global memory metadata for each slot, it is possible to set and then reset the thread group ID value at various points in processing, thus enabling the global memory monitor to react to an increase in the count of such slots with various ID's by allocating additional compute (CPU) resources to specific thread groups that will increase the speed through which these slots with this property will get processed.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for dynamic CPU allocation based on feature usage profiles of shared global memory, the computer program including a set of instructions which, when executed by a computer, cause the computer to perform a method comprising the steps of:
   waiting for expiration of a monitoring interval;
   upon expiration of the monitoring interval, determining by a global memory monitor a respective feature usage profile of shared global memory for the monitoring interval for each thread group, each respective feature usage profile of shared global memory being based on a number of slots of shared global memory containing data for processing by each of a plurality of thread groups at the end of the monitoring interval, each thread group being responsible for processing a respective type of memory access operation;
   allocating computational resources from a dynamically allocated portion of computational resources to the plurality of thread groups based on the feature usage profile of shared global memory; and
   dynamically allocating the dynamically allocated portion of computational resources over time according to evolving feature usage profiles of shared global memory by iterating the steps of waiting for expiration of the monitoring interval, determining the feature usage profiles of shared global memory, and allocating computational resources after each subsequent monitoring interval;
   wherein:
   a first of the plurality of thread groups is responsible for processing read hit memory access operations;
   a second of the plurality of thread groups is responsible for processing read miss memory access operations;
   a third of the plurality of thread groups is responsible for processing write destage memory access operations;
   and a fourth of the plurality of thread groups is responsible for processing local replication (LREP) write memory access operations.

2. The non-transitory tangible computer readable storage medium of claim 1, further comprising providing a fixed minimum allocation of the computational resources to each of the thread groups that are not part of the dynamically allocated portion of the computational resources.

3. The non-transitory tangible computer readable storage medium of claim 1, wherein the step of allocating computational resources from a dynamically allocated portion of computational resources to the plurality of thread groups comprises comparing the number of slots of shared global memory containing data for processing by each of a plurality of thread groups with a plurality of thresholds.

4. The non-transitory tangible computer readable storage medium of claim 3, wherein the plurality of thresholds comprise respective promotion and demotion thresholds for each of the respective thread groups.

5. A The non-transitory tangible computer readable storage medium of claim 4, wherein if a number of slots of shared global memory containing data for processing by the first of the thread groups is above a first promotion threshold for the first thread group, the step of allocating computational resources comprises increasing a first portion of the dynamically allocated computational resources that are assigned to the first thread group during an upcoming monitoring interval.

6. A The non-transitory tangible computer readable storage medium of claim 4, wherein if a number of slots of shared global memory containing data for processing by the second of the thread groups is below a first demotion threshold for the second thread group, the step of allocating computational resources comprises decreasing a portion of the dynamically allocated computational resources that are assigned to the second thread group during an upcoming monitoring interval.

7. The non-transitory tangible computer readable storage medium of claim 1, wherein the step of allocating computational resources from a dynamically allocated portion of computational resources to the plurality of thread groups comprises comparing the number of slots of shared global memory containing data for processing by each of a plurality of thread groups a number of slots of shared global memory containing data for processing by each of the plurality of thread groups during a prior monitoring interval.

8. The non-transitory tangible computer readable storage medium of claim 7, wherein if a number of slots of shared global memory containing data for processing by a first of the thread groups has increased since the prior monitoring interval, the step of allocating computational resources comprises increasing a first portion of the dynamically allocated computational resources that are assigned to the first thread group during an upcoming monitoring interval.

9. The non-transitory tangible computer readable storage medium of claim 7, wherein if a number of slots of shared global memory containing data for processing by a second of the thread groups has decreased since the prior monitoring interval, the step of allocating computational resources comprises decreasing a portion of the dynamically allocated computational resources that are assigned to the second thread group during an upcoming monitoring interval.

10. A method of dynamic CPU allocation based on feature usage profiles of shared global memory, comprising:

waiting for expiration of a monitoring interval;

upon expiration of the monitoring interval, determining by a global memory monitor a respective feature usage profile of shared global memory for the monitoring interval for each thread group, each respective feature usage profile of shared global memory being based on a number of slots of shared global memory containing data for processing by each of a plurality of thread groups at the end of the monitoring interval, each thread group being responsible for processing a respective type of memory access operation;

allocating computational resources from a dynamically allocated portion of computational resources to the plurality of thread groups based on the feature usage profile of shared global memory; and dynamically allocating the dynamically allocated portion of computational resources over time according to evolving feature usage profiles of shared global memory by iterating the steps of waiting for expiration of the monitoring interval, determining the feature usage profiles of shared global memory, and allocating computational resources after each subsequent monitoring interval;

wherein:

a first of the plurality of thread groups is responsible for processing read hit memory access operations;

a second of the plurality of thread groups is responsible for processing read miss memory access operations;

a third of the plurality of thread groups is responsible for processing write destage memory access operations; and a fourth of the plurality of thread groups is responsible for processing local replication (LREP) write memory access operations.

11. The method of claim 10, further comprising providing a fixed minimum allocation of the computational resources to each of the thread groups that are not part of the dynamically allocated portion of the computational resources.

12. The method of claim 10, wherein the step of allocating computational resources from a dynamically allocated portion of computational resources to the plurality of thread groups comprises comparing the number of slots of shared global memory containing data for processing by each of a plurality of thread groups with a plurality of thresholds.

13. The method of claim 12, wherein the plurality of thresholds comprise respective promotion and demotion thresholds for each of the respective thread groups.

14. A The method of claim 13, wherein if a number of slots of shared global memory containing data for processing by the first of the thread groups is above a first promotion threshold for the first thread group, the step of allocating computational resources comprises increasing a first portion of the dynamically allocated computational resources that are assigned to the first thread group during an upcoming monitoring interval.

15. A The method of claim 13, wherein if a number of slots of shared global memory containing data for processing by the second of the thread groups is below a first demotion threshold for the second thread group, the step of allocating computational resources comprises decreasing a portion of the dynamically allocated computational resources that are assigned to the second thread group during an upcoming monitoring interval.

16. The method of claim 10, wherein the step of allocating computational resources from a dynamically allocated portion of computational resources to the plurality of thread groups comprises comparing the number of slots of shared global memory containing data for processing by each of a plurality of thread groups a number of slots of shared global memory containing data for processing by each of the plurality of thread groups during a prior monitoring interval.

17. The method of claim 16, wherein if a number of slots of shared global memory containing data for processing by a first of the thread groups has increased since the prior monitoring interval, the step of allocating computational resources comprises increasing a first portion of the dynamically allocated computational resources that are assigned to the first thread group during an upcoming monitoring interval.

18. The method of claim 16, wherein if a number of slots of shared global memory containing data for processing by a second of the thread groups has decreased since the prior monitoring interval, the step of allocating computational resources comprises decreasing a portion of the dynamically allocated computational resources that are assigned to the second thread group during an upcoming monitoring interval.

\* \* \* \* \*